Patented Aug. 2, 1932

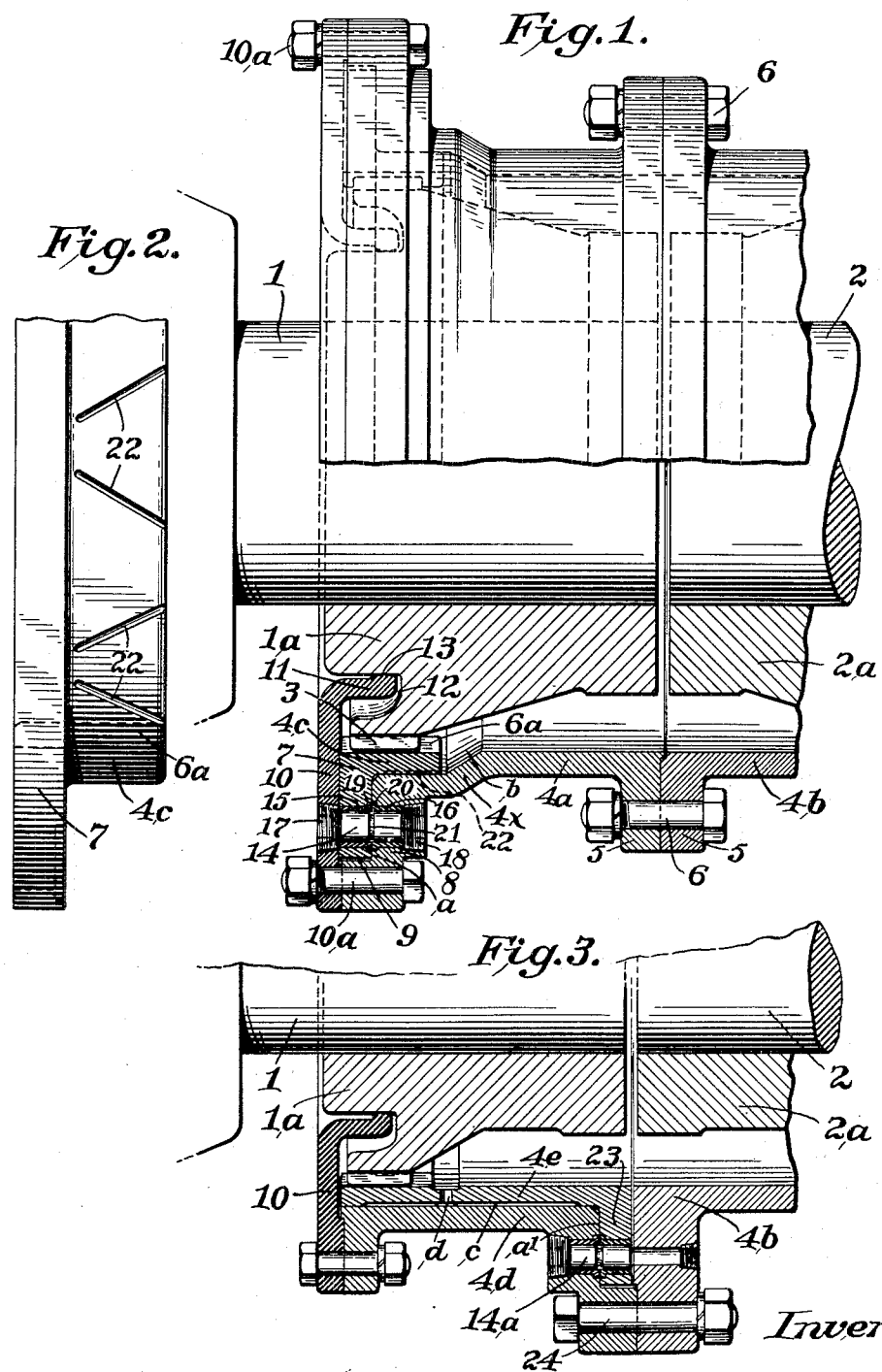

1,870,153

UNITED STATES PATENT OFFICE

WALTER C. THOMAN, OF BALTIMORE, MARYLAND, ASSIGNOR TO THE BARTLETT HAYWARD COMPANY, OF BALTIMORE, MARYLAND, A CORPORATION OF MARYLAND

FLEXIBLE SHAFT COUPLING

Application filed December 24, 1929. Serial No. 416,245.

The invention concerns an improvement in the general type of flexible shaft coupling disclosed, for instance, in Letters Patent of the United States granted to Gustave Fast, Reissue No. 15,177, dated August 16th, 1921, in which a sleeve provided with internal keys in the form of teeth engage similar keys or teeth on hubs or members secured to the ends of the shafts, the said sleeve being adapted to have rocking movement relative to the said hubs to accommodate any misalignment of the coupled shafts.

An object of the present invention is to incorporate in the coupling a shear pin connection which will be ruptured when extraordinary resistance is encountered to free revolution of the coupled machine or elements thereof, or, in other words, when the coupling is subjected to a load above that normally prescribed.

In carrying out the invention, provision is made for supplying lubricant to the sheared connection and to the parts of the coupling between which a relative rotation is set up by reason of the shearing of the pin, the lubricating organization being such that the shear pin and adjacent parts are lubricated from the same arrangement and construction of parts which supply lubricant to the teeth or keys inter-connecting the sleeve and shaft hubs.

In the accompanying drawing:

Figure 1 is a central vertical sectional view of one form of a flexible shaft coupling to which the invention is applicable.

Fig. 2 is a detail view of the ring 4c of Fig. 1.

Fig. 3 is a view similar to Fig. 1 of a modified form of the invention.

In the drawing I have shown for convenience a flexible coupling of the general form shown in the Fast patent, although it will be understood that the invention is not confined to its combination with a coupling of the specific construction of the Fast coupling. In the drawing 1 and 2 indicate the shaft ends which are to be coupled. On these shaft ends are fixed the members or hubs 1a, 2a. These have each a circular row of spline members 3 in the form of keys or teeth. Surrounding the shaft ends with their attached hubs or blocks is a sleeve made in sections 4a, 4b. These sections are joined by flanges 5 bolted together at 6. The sleeve sections have spline members or keys in the form of annular rows of teeth 6a which engage the annular rows of teeth on the shaft sections. One sleeve section is split or formed in two parts, one of these being the portion 4a and the other part being in the form of a ring 4c having an annular integral flange 7, which fits against the annular flange 8, the periphery of the flange 7 fitting within an annular shoulder 9 on the flange 8. The ring portion 4c carries one of the annular rows of teeth 6a. At the ends of the sleeve are the covers or flanges 10 bolted at 10a to the sleeve flanges 8, said end walls 10 having flanges 11 entering recesses 12 in the ends of the hubs and having rounded bearings 13 engaging the said shaft hubs on the transverse center line of the key ribs or teeth 6a, These end covers form closures for the sleeve and in the particular form of coupling illustrated they provide the rocking bearings at 13 to allow the sleeve to accommodate itself to misalignment of the shaft ends, though it will be understood that I do not limit myself to this manner of providing for the rocking of the sleeve relative to the hubs on the shaft ends. These end covers or walls 10 complete the enclosure of the coupling and provide the means for excluding dust or moisture and for retaining lubricant within the coupling sleeve, the bearings at 13 effectively sealing the structure. One of these end covers overlies the sleeve section or ring 4c, the flange 7 of which lies between it and the flange 8 of the main sleeve portion 4a. At 14 is shown a shear pin, connecting the ring 4c with the sleeve section 4a. For this purpose, the shear pin extends across the joint between the flanges 7 and 8 and into bushings 15, 16 lying in said flanges. The shear pin is held in place by bronze plugs 17, 18 screw threaded into sockets in the flanges. These plugs have rectangular sockets, for receiving a wrench, by which they are screwed into place to hold the shear pin and the bushings. These bushings have flanges 19, 20 at their contacting inner ends. The bushings are of hardened steel, while the shear pin is of softer metal weakened at its central portion 21. Under excessive load imposed upon the coupling, above that it is prescribed to carry, due, for instance, to jamming of either of the coupled machines or elements thereof, the shear pin will be ruptured and in this action the hardened bushings will act as cutters or shearing elements to make a clean cut across the pin.

The severing of the pin will allow the shaft hub 1a and the toothed ring 4c to act as one body, either rotating in relation to the sleeve, or remaining stationary as one body, while the sleeve rotates, as the case may be, in accordance with whether the excessive resistance or load is applied to the shaft end 1a or 2a. In any event, there will be a relative rotative movement between ring 4c and the sleeve, and provision is made to lubricate the joint a between these parts and also to lubricate the faces of the shearing pin where the rupture or shear occurs.

The construction described lends itself to the accomplishment of this lubricating action, because centrifugal force throws the lubricant outwardly so as to pass along grooves 22 with which the ring 4c is provided on its exterior face, said grooves leading the lubricant to the joint a between the ring and the flange of the sleeve section 4a. This joint a is in a plane transverse to the axis of the coupling and the lubricant will readily find its way into and along this joint. Aiding in this lubricating action also is the formation of parts by which a well or recess b is formed, into which the lubricant will lodge. This well, channel, or recess b is provided by inclining the wall portion 4x of the section 4a outwardly from the axial line of the coupling and towards the end thereof. The surface of the hub 1a is also inclined outwardly in relation to the axis of the coupling.

In Fig. 3 the split section of the sleeve 4d has its joint c extending lengthwise of the coupling. The member 4e of the split section is flanged at 23, which flange lies between the flanges of the sections 4b and 4d. A shear pin 14a extends across the joint a¹ between this flange and the flange of the section 4d. The section 4d is bolted to the section 4b by the bolts 24. The portion 4e of the split sleeve section carries the spline teeth or keys, which engage with the teeth of the shaft hub. Lubricant will enter the joint c and pass to the contacting faces of the flanges of the parts 4d and 4e, but not with the same facility as in the form first described.

The section 4e may be provided with grooves on its exterior face running lengthwise of the joint c to convey the lubricant and a port may be provided at d for access of the lubricant to the said joint.

The screw threaded pipe plugs 18 serve to hold the shear pin in proper position with its weakened central portion in line with the joint between the flanges and they serve also to hold the bushings 15 in proper position to insure the shearing of the pin at the right point. These plugs also serve to prevent the escape of the lubricant.

I claim:

1. In combination, shaft hubs to be attached to the shaft ends and each having teeth, a sleeve encircling said hubs and having rows of teeth to engage the hub teeth, said sleeve at one end having its wall flaring outwardly and provided with an annular flange lying in a plane transverse to the axis of the sleeve, and an end wall secured to said flange and having a lubricant sealing engagement at its edge with the hub section, said sleeve being split, providing a section carrying one of the rows of teeth and having an annular flange fitting against the annular flange first mentioned and enclosed by the said end wall, a shearing pin connecting the flange of the tooth-carrying section of the sleeve with the adjacent part of the sleeve, the opposing faces of the tooth-carrying section and the adjacent sleeve portion, which are relatively movable when the pin shears, being subject to the lubricant within the sleeve, which is directed thereto by the flared wall of the sleeve, substantially as described.

2. In combination, shaft hubs to be attached to the shaft ends, a sleeve to enclose said hubs, interengaging rows of teeth between the sleeve and the hubs, said sleeve having a comparatively narrow ring-like section attached thereto at one end by a shear pin on the inner side of said sleeve and means to retain lubricant therein.

3. In combination, shaft hubs having teeth, a sleeve enclosing said hubs and having at one end a flange lying in a plane transverse to the axis of the coupling, a tooth carrying section the teeth of which engages the teeth on one of the hubs, said section having a flange lying against the outer face of the end flange first mentioned, a shear pin between the said flanges, and a detachable end plate attached to the flange first mentioned enclosing the toothed section and having a rocking bearing on the shaft hub, said tooth carrying section being comparatively narrow, substantially as described.

In testimony whereof, I affix my signature.

WALTER C. THOMAN.